(12) United States Patent
Reidhaar

(10) Patent No.: US 9,720,350 B2
(45) Date of Patent: *Aug. 1, 2017

(54) DEVICE FOR CONNECTING A CENTERLESS AUGER TO A ROTATABLE MEMBER

(71) Applicant: LEXMARK INTERNATIONAL, INC., Lexington, KY (US)

(72) Inventor: Glen Alan Reidhaar, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,285

(22) Filed: Oct. 10, 2016

(65) Prior Publication Data

US 2017/0023883 A1    Jan. 26, 2017

Related U.S. Application Data

(63) Continuation of application No. 14/049,251, filed on Oct. 9, 2013, now Pat. No. 9,488,955.

(51) Int. Cl.
*G03G 21/10* (2006.01)
*F16D 1/108* (2006.01)
*G03G 15/08* (2006.01)

(52) U.S. Cl.
CPC ......... *G03G 15/0891* (2013.01); *F16D 1/108* (2013.01); *G03G 21/105* (2013.01); *G03G 2215/0833* (2013.01); *Y10T 403/7039* (2015.01)

(58) Field of Classification Search
CPC ......... G03G 21/105; G03G 2215/0833; G03G 15/0891; F16D 1/108; F16D 1/02; Y10T 403/7039
USPC ................. 399/256, 358, 359, 360
See application file for complete search history.

(56) References Cited

U.S. PATENT DOCUMENTS 9,488,955 B2 * 11/2016 Reidhaar ................ F16D 1/108

\* cited by examiner

*Primary Examiner* — Sophia S Chen

(57) ABSTRACT

An auger assembly according to one example embodiment includes an auger having a helical flight extending along a longitudinal axis. The auger has a central opening running along the longitudinal axis. The auger has an end that includes at least a portion of a turn having substantially zero pitch. A retaining member has a body including a groove on an outer surface of the body. The groove has a shape complementary to the helical flight at the end of the auger. At least a portion of the end of the auger is retained within the groove. A rotatable coupling member extends along the longitudinal axis. At least a portion of the rotatable coupling member is positioned within the central opening of the auger and presses the outer surface of the retaining member against an inner diameter of the end of the auger.

14 Claims, 11 Drawing Sheets

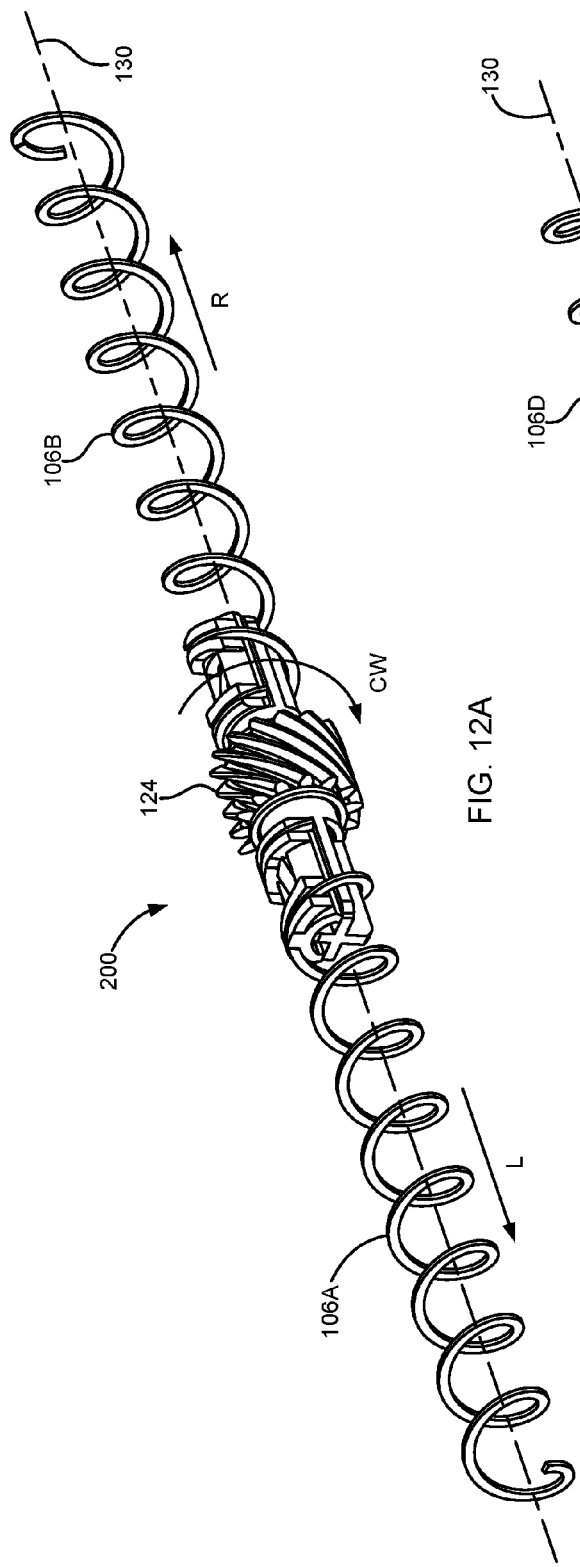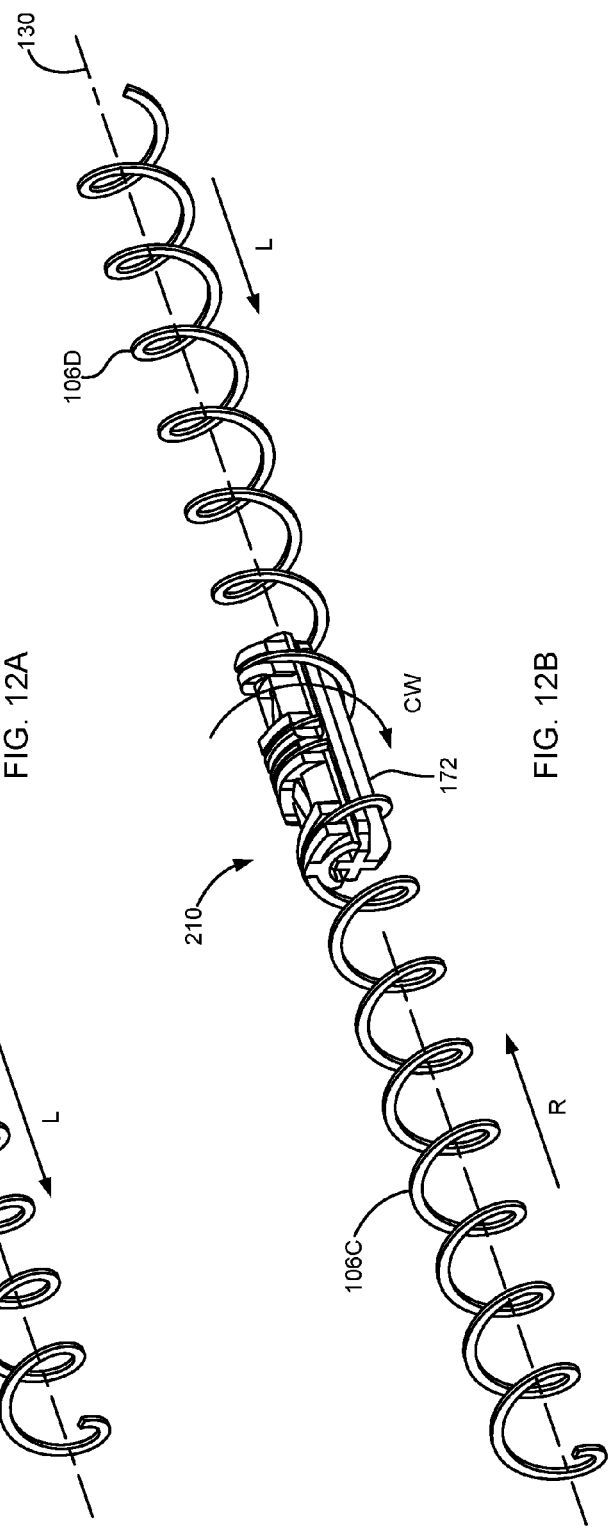
FIG. 12A
FIG. 12B

DEVICE FOR CONNECTING A CENTERLESS AUGER TO A ROTATABLE MEMBER

CROSS REFERENCES TO RELATED APPLICATIONS

This patent application is a continuation application of U.S. patent application Ser. No. 14/049,251, filed Oct. 9, 2013, entitled "A Device for Connecting a Centerless Auger to a Rotatable Member."

BACKGROUND

1. Field of the Invention

The present invention relates generally to augers and more particularly to a device for connecting a centerless auger to a rotatable member.

2. Description of the Related Art

Image forming devices such as printers, copiers, facsimile machines, and the like, produce unusable "waste" or residual toner as a byproduct of an electrophotography (EP) process. Ideally, all of the toner that is picked up by a photoconductive drum such as from a developer roll in the case of a single component development process or a magnetic roll in the case of a dual component development process would be transferred onto a media sheet (or an intermediate transfer member (ITM) in the case of a two-step toner transfer process). However, due to inefficiencies within the image transfer process, all of the toner put on the photoconductive drum does not get transferred to the media sheet or ITM. This residual toner left on the photoconductive drum after it has contacted the media sheet or ITM must be removed before the next image is formed to avoid contamination by the residual toner. For this purpose, a cleaner blade or a cleaner brush is placed in contact with the photoconductive drum to wipe the residual toner from its surface. The residual toner removed by the cleaner blade or cleaner brush is then stored in a sealed residual toner compartment disposed adjacent the photoconductive drum to prevent it from being distributed inside the printer. The residual toner compartment should preferably be sized to hold a large amount of residual toner to minimize frequent removal from the image forming device. It is also desirable for the overall size of the image forming device to be as small as possible, limiting the size of the residual toner compartment. Accordingly, there is a need for a mechanism to maximize the amount of residual toner that can be stored within the residual toner compartment.

Augers have proved to be an effective means of moving toner from one area to another for a wide variety of toner applications. Augers used for transferring residual toner are usually made from either molded plastic or metal wire stock. However, each of these types of augers has its own drawbacks. For example, injection molded plastic augers have proved to be easier to manufacture than the metal wire variety. In addition, providing a drive for a plastic auger is more straightforward because the drive shaft for the auger can be molded in the same cavity as the helix, resulting in a simple one piece design. However, the problem with the plastic molded augers is that these are most often resistant to bending and can only transfer waste toner in straight channels. Comparatively, the metal wire augers have an advantage of being able to bend and as a result transfer the residual toner through a curved channel effectively. Additionally, the space in the center of a centerless auger also carries material thereby permitting a higher transfer rate.

A barrier for practical implementation of metal wire augers is the need for a metal drive shaft used to connect the auger with its drive source. Having a metal drive shaft on which to fix the auger is advantageous in that the auger can be soldered or welded onto the drive shaft without an attachment part such as a screw, pin or other retainer. However, metal drive shafts add significant cost to the overall auger design, decreasing its likelihood for use in mass production.

Some manufacturers have used a plastic drive shaft instead of a metal drive shaft to reduce some of the above problems faced by the metal drive shafts. For example, the cost of the drive component is reduced substantially by using plastic instead of a machined or cast metal part. Also, an additional processing station such as welding or soldering is not needed if the drive is made from plastic. Finally, a plastic drive shaft makes it easier to attach the gearing that is needed to turn the assembly.

However, securing or coupling the metal auger to the plastic drive shaft is a significant obstacle in designing a plastic drive shaft. The coupling mechanism must fit inside the auger channel without interference in order for the auger to turn freely. Further, the size of the coupling mechanism is also generally very small, making it difficult to transmit the torque needed without risk of breakage. An alternative employment of a coupling mechanism between the auger and the plastic drive shaft is to mold the auger into the plastic drive shaft to form a unitary device. Unfortunately, this method is very sensitive to manufacturing parameters and is a much more expensive alternative to hand assembly. For example, it is difficult to clamp onto the auger with an injection molding machine without damaging the auger and without allowing molten plastic to leak out along the auger wire. Further, the metal auger may not adhere sufficiently to the plastic drive shaft and can be easily disconnected from the plastic drive shaft by unscrewing the auger from the plastic drive shaft.

Thus, there is a need to provide a secure coupling between an auger and corresponding drive shaft that addresses at least some of the above problems and still provides a reliable residual toner removal operation within the residual toner compartment.

SUMMARY OF THE INVENTION

An auger assembly according to one example embodiment includes an auger having a helical flight extending along a longitudinal axis. The auger has a central opening running along the longitudinal axis. The auger has an end that includes at least a portion of a turn having substantially zero pitch. A retaining member has a body including a groove on an outer surface of the body. The groove has a shape complementary to the helical flight at the end of the auger. At least a portion of the end of the auger is retained within the groove. A rotatable coupling member extends along the longitudinal axis. At least a portion of the rotatable coupling member is positioned within the central opening of the auger and presses the outer surface of the retaining member against an inner diameter of the end of the auger.

An auger assembly according to another example embodiment includes a rotatable coupling member having an elongated body having a first end portion and a second end portion. A first retaining member and a second retaining member each have a body including a groove on an outer surface of the body. A first auger and a second auger each have a helical flight extending along a longitudinal axis. Each of the first and second augers has a central opening running along the longitudinal axis. Each of the first and second augers has an end that includes at least a portion of a turn having substantially zero pitch. The groove on the outer surface of the first retaining member has a shape complementary to the helical flight at said end of the first auger and the groove on the outer surface of the second retaining member has a shape complementary to the helical flight at said end of the second auger. At least a portion of said end of the first auger is retained within the groove of the first retaining member and at least a portion of said end of the second auger is retained within the groove of the second retaining member. The first end portion of the rotatable coupling member is positioned within the central opening of the first auger and presses the outer surface of the first retaining member against an inner diameter of said end of the first auger and the second end portion of the rotatable coupling member is positioned within the central opening of the second auger and presses the outer surface of the second retaining member against an inner diameter of said end of the second auger.

A coupling device for retaining a helical auger on a rotating member according to one example embodiment includes an elongated body insertably positionable within an inner diameter of the auger between the inner diameter of an end of the auger and the rotating member. A groove is formed on an outer surface of the elongated body having a shape complementary a helical flight of the auger. A snap-fit engagement feature on an inner surface of the elongated body enables removable coupling of the retaining member to the rotating member.

BRIEF DESCRIPTION OF THE DRAWINGS

The accompanying drawings incorporated in and forming a part of the specification, illustrate several aspects of the present disclosure, and together with the description serve to explain the principles of the present disclosure.

FIG. 12A and FIG. 12B are perspective views of auger assemblies having two augers according to example embodiments.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
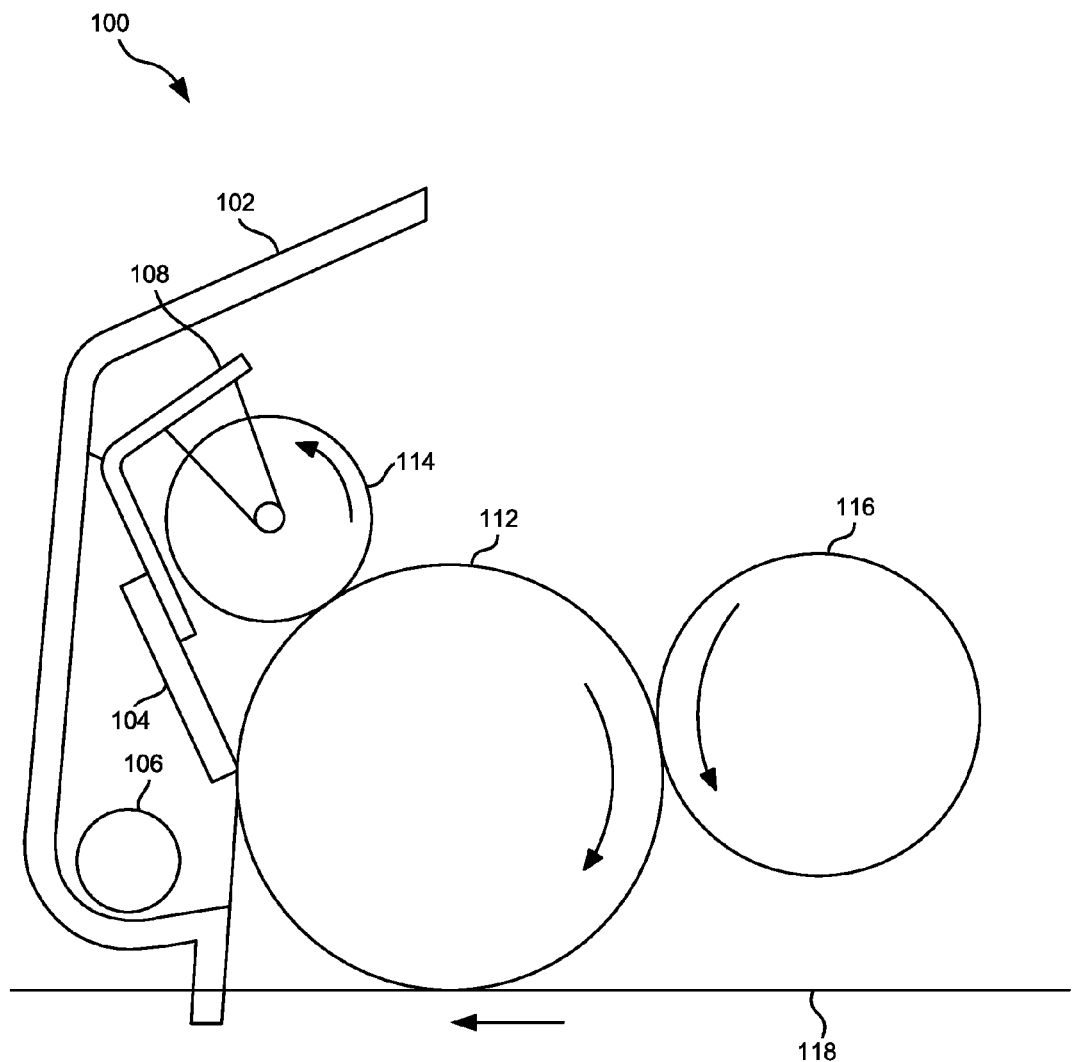
FIG. 1 is a cross-sectional schematic view of a residual toner removal system and photoconductive drum of an image forming device according to one example embodiment.
Figure 2:
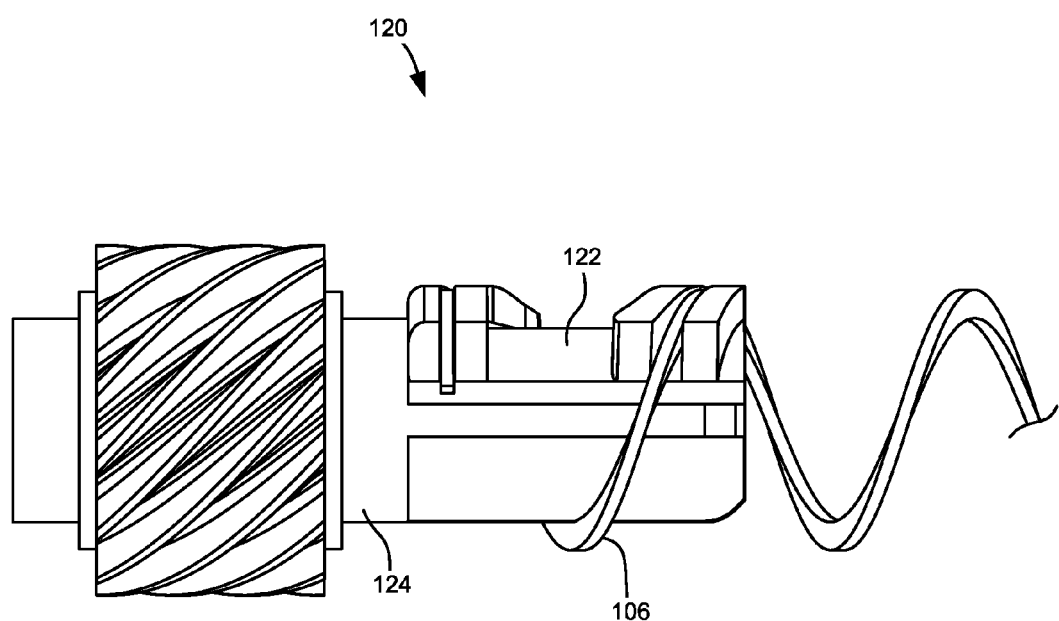
FIG. 2 is a side elevational view of an auger assembly according to one example embodiment.

FIG. 1 illustrates a cleaner assembly 100 including a cleaner housing 102, a cleaner blade 104, and an auger 106 disposed within the cleaner housing 102. A bracket member 108 is attached to the cleaner housing 102 to hold cleaner blade 104. The auger 106 is disposed within the cleaner housing 102 and operably connected to a drive member 124 (FIG. 2). A photoconductive drum 112 is rotated against a charge roller 114 and a developer roll 116 that develops the photoconductive drum 112 with toner. Alternatively, a magnetic roll may supply toner to photoconductive drum 112 in the case of a dual component development system. An intermediate transfer belt 118 passes below the photoconductive drum 112 and receives the toner transferred to the photoconductive drum 112. Alternatively, photoconductive drum 112 may apply toner directly to the media sheet without the use of intermediate transfer belt 118. The cleaner blade 104 contacts an outer surface of the photoconductive drum 112. Thus, any toner that is not transferred from the photoconductive drum 112 to the intermediate transfer belt 118 is removed by the cleaner blade 104. The toner that is removed by the cleaner blade 104 falls into the cleaner housing 102. The auger 106 disposed within the cleaner housing 102 then moves the removed toner and deposits the toner into a residual toner compartment (see FIG. 13) that is connected to the cleaner assembly 100.

Figure 3:
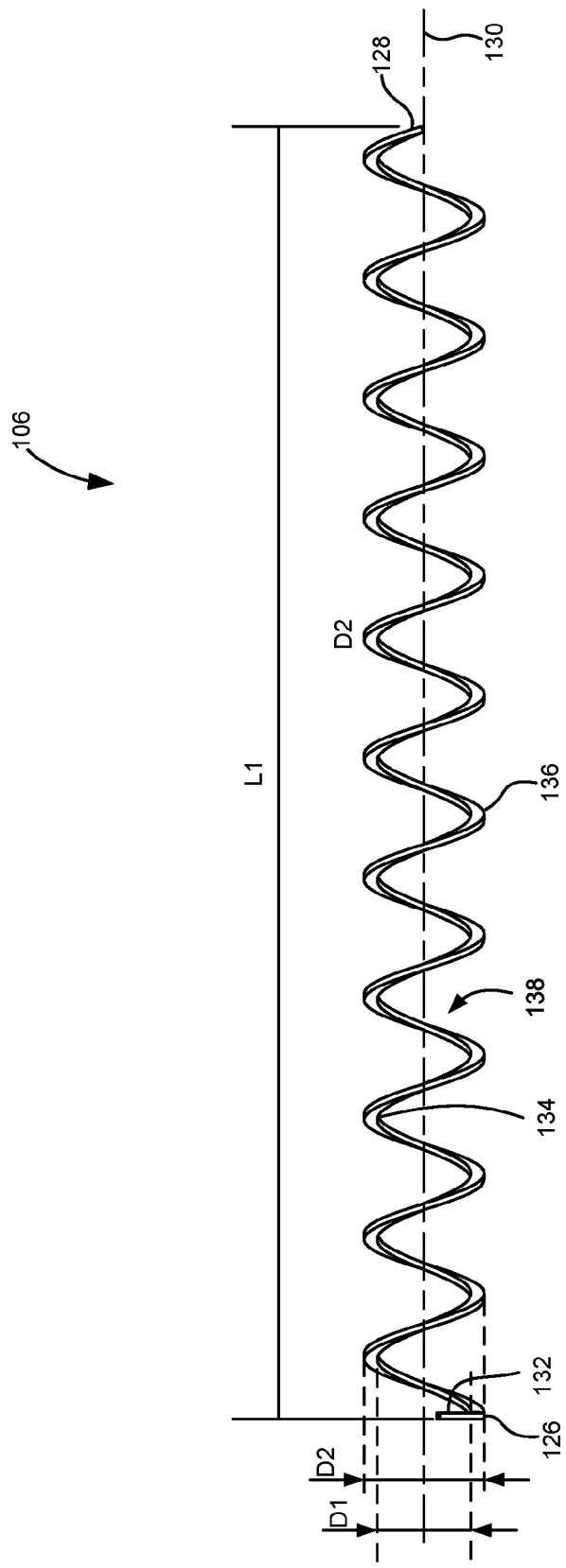
FIG. 3 is a side elevational view of a centerless auger of the auger assembly of FIG. 2.

FIG. 2 illustrates an auger assembly 120 including auger 106, a retaining member 122, and drive member 124. FIG. 3 depicts the auger 106 in the uninstalled state prior to its assembly within the cleaner housing 102. Auger 106 has a helical flight having a first end 126, a second end 128, and a length L1 extending between the first end 126 and the second end 128 along a longitudinal axis 130. The first end 126 is formed to have a portion of a turn 132 substantially perpendicular to the longitudinal axis 130 (i.e., having substantially zero pitch). In the illustrated embodiment, the first end 126 has one-fourth of a turn 132 substantially perpendicular to the longitudinal axis 130; however, more than one-fourth of a turn may be used as desired. Less than one-fourth of a turn may also be used but caution must be taken to ensure that auger 106 will not rotationally decouple from retaining member 122 as discussed in greater detail below. Geometrical forms other than perpendicular may be used for the first end 126 to retain the auger 106 on the drive member 124 (FIG. 2). For example, first end 126 (and second end 128) may have a pitch that differs from the rest of auger 106 (which has a positive pitch) such as a pitch that is significantly less than the pitch of the rest of auger 106 or a negative pitch. However, it is desirable to have a relatively simple form to avoid expensive design parameters required by complex wire forms such as reverse bends, straight lengths, etc. The auger 106 is dimensioned to have a radially inward facing surface 134 and an outer surface 136 extending along the length L1 of the auger 106. Further, the radially inward facing surface 134 of the auger 106 defines a central opening 138 that extends from the first end 126 to the second end 128 of the auger 106 or along the longitudinal axis 130. As a result, the auger 106 may be referred to as a centerless auger. Furthermore, the central opening 138 of the auger 106 has an inner diameter D1 that remains substantially constant. In the example embodiment shown, auger 106 is a flat wire auger. In another embodiment, auger 106 is a round wire auger.

Figure 4:
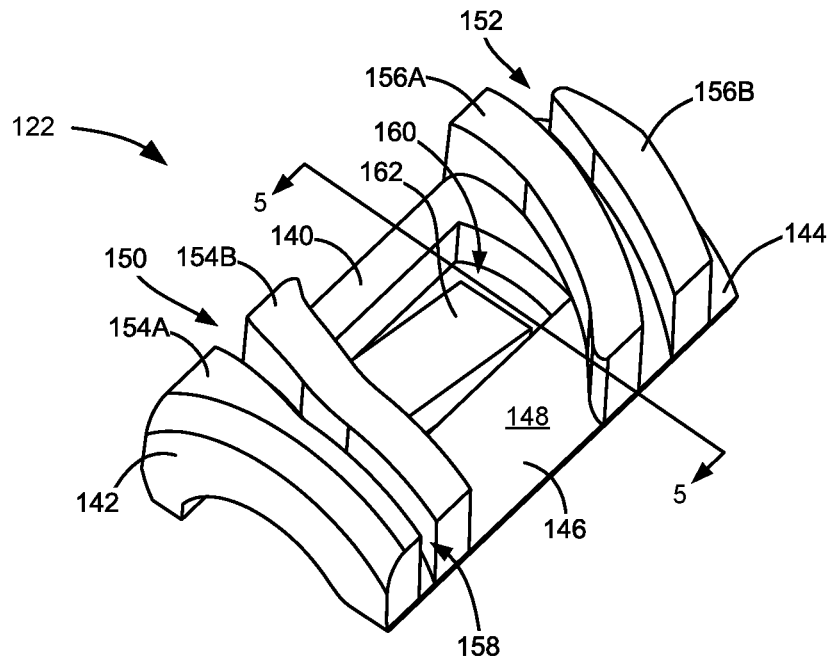
FIG. 4 is a perspective view of a retaining member of the auger assembly of FIG. 2.
Figure 5:
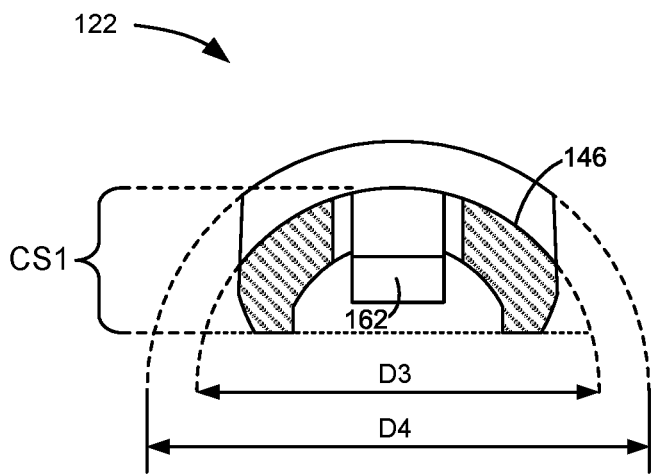
FIG. 5 is a cross-sectional view taken along line 5-5 in FIG. 4 of the retaining member of FIG. 4.
Figure 10A:
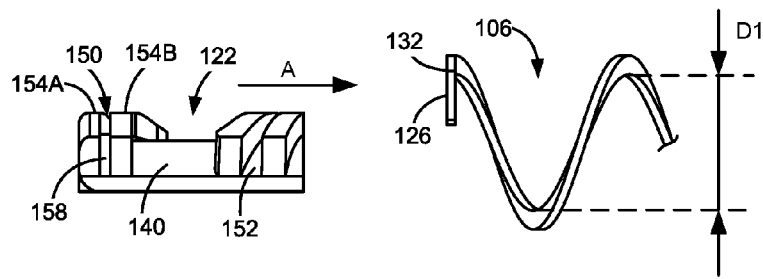
FIGS. 10A-10E are sequential views of the assembly of the auger assembly of FIG. 2.
Figure 10B:
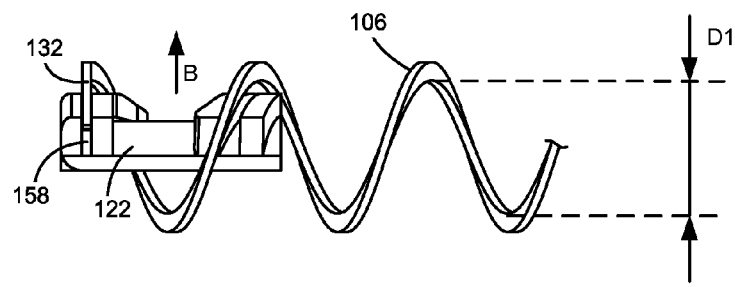
Figure 10C:
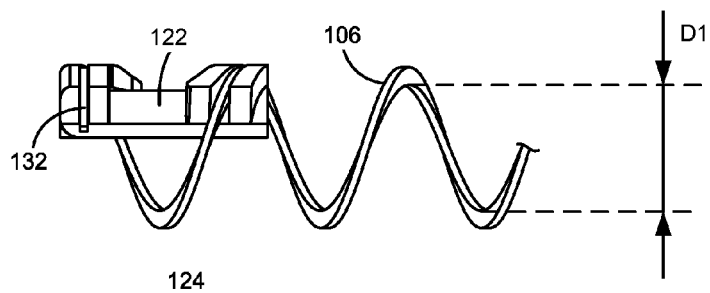

FIG. 4 illustrates a retaining member 122 for receiving the first end 126 of the auger 106 (as depicted in FIGS. 10A-10C). The retaining member 122 has an elongated body 140 having a proximal end portion 142, a distal end portion 144, and a middle portion 146 extending between the proximal end portion 142 and the distal end portion 144. The middle portion 146 has an outer surface 148 that defines an outer diameter D3 (FIG. 5). The retaining member 122 also includes grooves 150, 152 formed on the outer surface 148 of the elongated body 140. Grooves 150, 152 are positioned adjacent to proximal end portion 142 and distal end portion 144, respectively, and are formed between a pair of opposed walls 154A, 154B and 156A, 156B, respectively, extending from the outer surface 148 of the elongated body 140. Opposed walls 154A, 154B are positioned adjacent to the proximal end portion 142 and opposed walls 156A, 156B are positioned adjacent to the distal end portion 144. Further, groove 150 has a section 158 that is substantially perpendicular to the elongated body 140 (best seen in FIG. 10A). With reference to FIGS. 10A-10C, grooves 150, 152 are shaped to be complementary to the shape of the first end 126 of the auger 106 to accommodate the first end 126 of the auger 106 therein. As shown in FIG. 5, the outer diameter D3 of the outer surface 148 of the elongated body 140 is substantially equal to the inner diameter D1 of the auger 106. Furthermore, the outer diameter D4 of the retaining member 122 is substantially equal to the outer diameter D2 of the auger 106. The elongated body 140 has a cross-sectional shape defining a first circumferential section CS1 of the inner diameter D1 of the auger 106. Retaining member 122 further includes a recess 160 formed on the middle portion 146 of the elongated body 140 and a hook member 162 extending diagonally from near the proximal end portion 142 towards the longitudinal axis 130 and the distal end portion 144. When the retaining member 122 is mounted on the drive member 124, the hook member 162 forms a snap fit engagement with drive member 124 and acts as a barrier to prevent the retaining member 122 from disengaging from the drive member 124.

Figure 6:
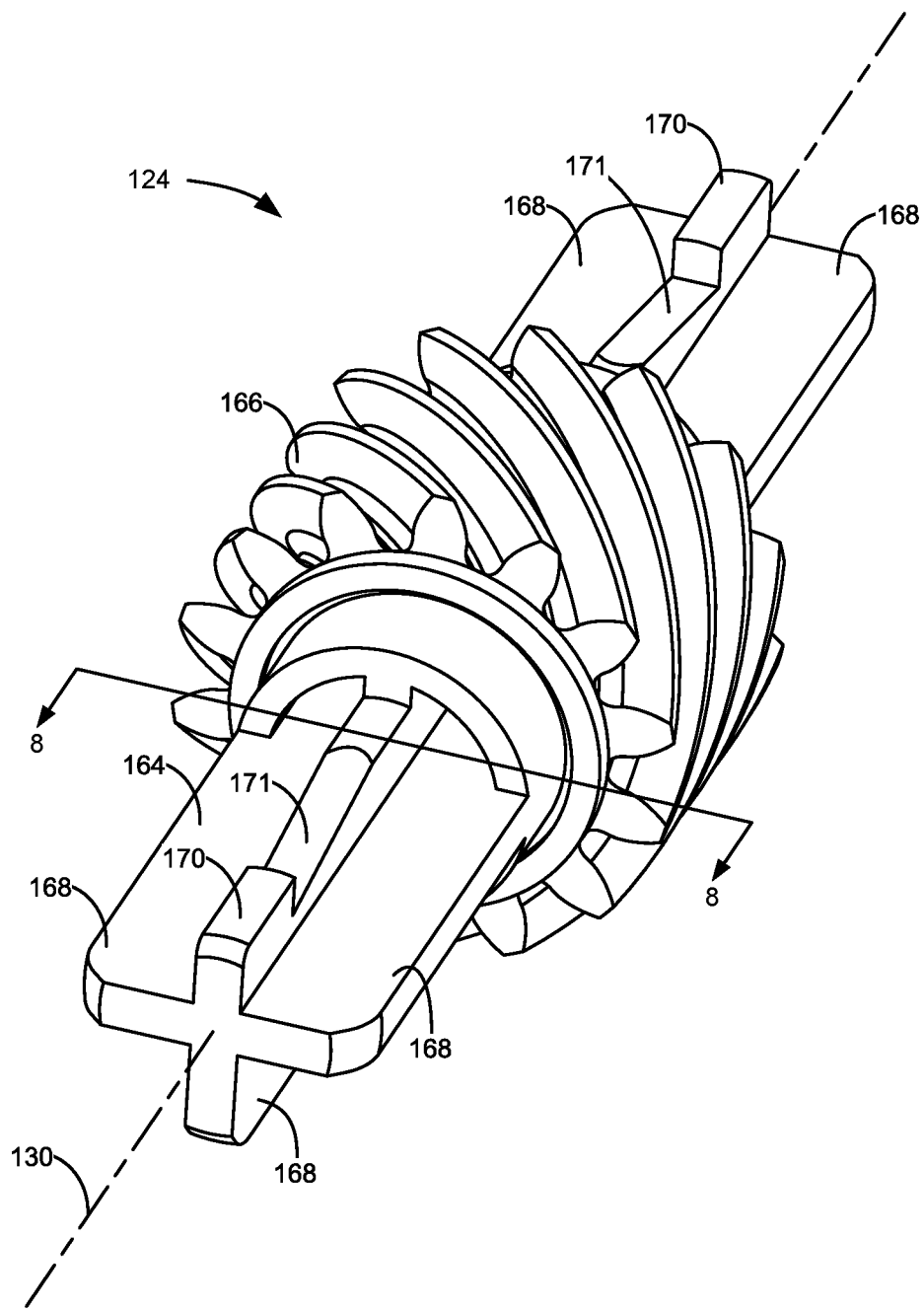
FIG. 6 is a perspective view of a drive member of the auger assembly of FIG. 2.
Figure 8:
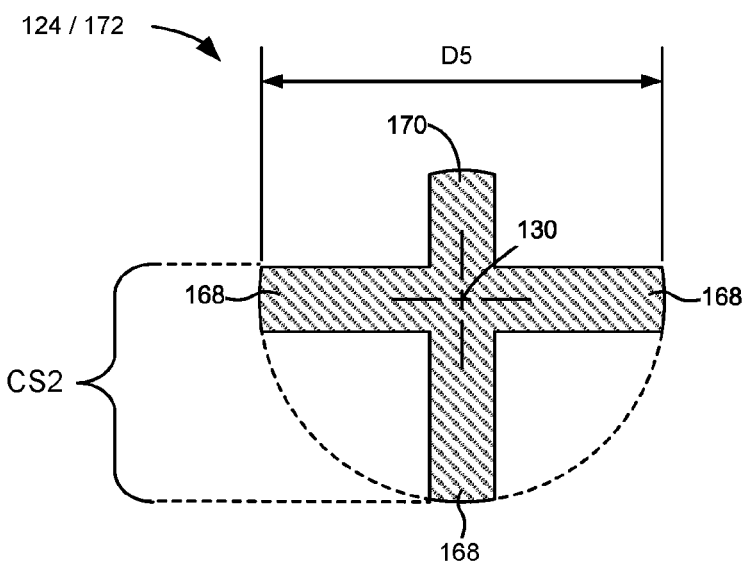
FIG. 8 is a cross-sectional view taken along line 8-8 in FIG. 6 of the drive member of FIG. 6 and the connector of FIG. 7.
Figure 9:
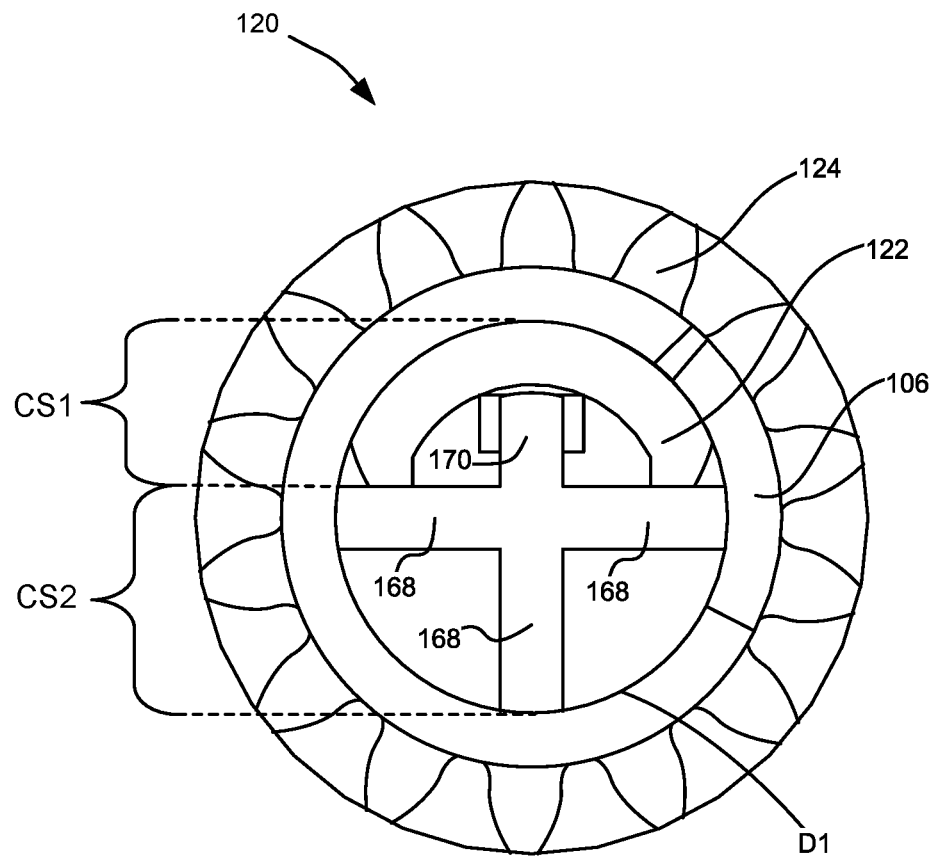
FIG. 9 is an end elevational view of the auger assembly of FIG. 2.
Figure 10D:
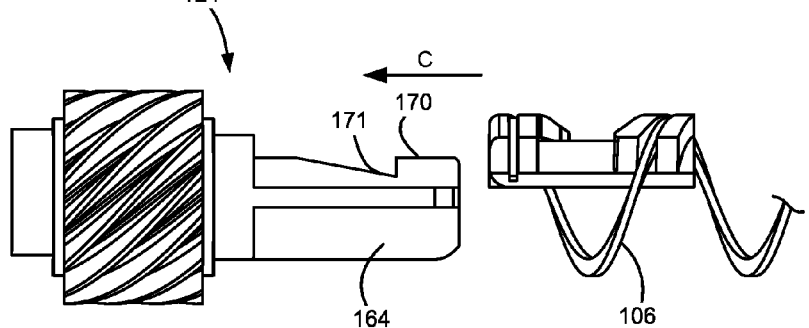
Figure 10E:
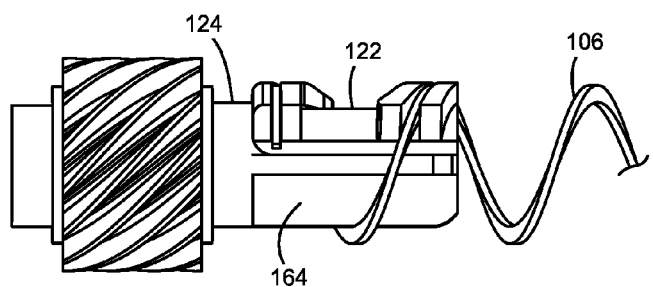

FIG. 6 illustrates a drive member 124 for rotating the auger 106 according to an example embodiment. Drive member 124 has an elongated shape 164 for mounting the retaining member 122 and the auger 106 thereon (as depicted in FIGS. 10D-10E). The drive member 124 includes a gear 166 which receives rotational power directly or indirectly from a motor (not shown). In one example embodiment, the gear 166 is selectively a helical gear to minimize noise and to reduce the required power. With reference to FIG. 8, the elongated shape 164 of the drive member 124 has a cross-section defined by a plurality of ribs 168 extending radially from the longitudinal axis 130. The cross-section defined by the plurality of ribs 168 has an outer diameter D5 which is substantially equal to the inner diameter D1 of the auger 106. The ends of each of the plurality of ribs 168 define a second circumferential section CS2 of the inner diameter D1 of the auger 106 complementary to the first circumferential section CS1 of the inner diameter D1 of the auger 106 (FIG. 9). The elongated shape 164 further includes a rib 170 and a recess 171 adjacent the rib 170 for engaging the hook member 162 of the retaining member 122 when the retaining member 122 is mounted thereon. While it is shown in FIGS. 4 and 5 that the hook member 162 is on the retaining member 122 and in FIGS. 6 and 8 that the rib 170 and recess 171 for engaging the hook member 162 are on the drive member 124, in the alternative, the hook member 162 and the rib 170 and recess 171 may be interchangeable such that the rib 170 and recess 171 may be formed on the retaining member 122 and the hook member 162 on the drive member 124. Further, as depicted in FIG. 6, the drive member 124 may further include a second elongated shape extending away from the first elongated shape in the opposite direction for mounting a second auger (see FIG. 12A).

Figure 7:
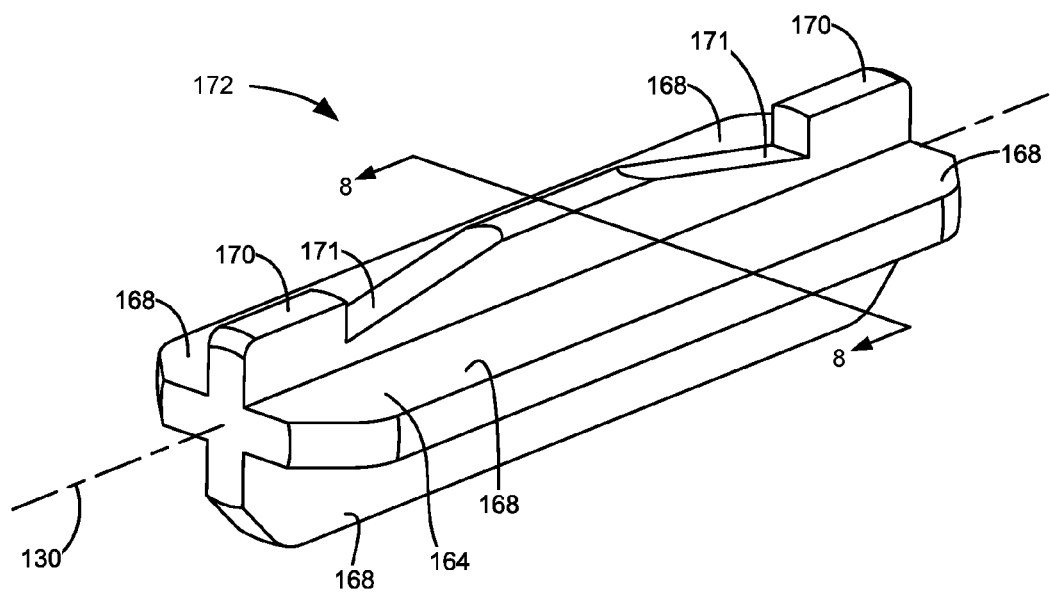
FIG. 7 is a perspective view of a connector for use with the auger assembly of FIG. 2 according to one example embodiment.

In another contemplated embodiment illustrated in FIG. 12B, the auger 106 and the retaining member 122 are mounted on a connector 172 instead of on drive member 124. Connector 172 may receive rotational motion from a second auger connected thereto. As shown in FIG. 7, connector 172 has the same features as that of drive member 124 except that connector 172 does not have gear 166. In one embodiment, connector 172 has an elongated shape 164 having a cross-section defined by a plurality of ribs 168 extending radially from the longitudinal axis 130. The cross-section defined by the plurality of ribs 168 has an outer diameter D5 which is substantially equal to the inner diameter D1 of the auger 106 (FIG. 3). The plurality of ribs 168 define a second circumferential section CS2 of the inner diameter D1 of the auger 106 that is complementary to the first circumferential section CS1 defined by the cross-sectional shape of the retaining member 122. The elongated shape 164 further includes a rib 170 and a recess 171 adjacent the rib 170 for engaging the hook member 162 of the retaining member 122 when the retaining member 122 is mounted thereon. The elongated shape 164 of the connector 172 may extend to about twice the length of the retaining member 122 in order to link two augers to connector 172. Although drive member 124 and connector 172 are illustrated as having ribs 168 and 170 that engage retaining member 122, drive member 124, connector 172 and retaining member 122 may have any suitable shape. For example, drive member 124 and connector 172 may include a cylindrical portion that is received by a sleeve-like retaining member 122.

FIGS. 10A-10E depict sequential views for the assembly of the auger assembly 120 of FIG. 2. As shown in FIG. 10A, the retaining member 122 is inserted into the first end 126 of the auger 106 in the direction indicated by Arrow A. The retaining member is then raised up in the direction of Arrow B (FIG. 10B) and pressed against the inner diameter D1 of the auger 106 such that the first end 126 of the auger wire 106 is inserted into the grooves 150, 152 of the retaining member 122 as depicted in FIG. 10C. In this embodiment, the insertion of auger 106 into grooves 150, 152 holds retaining member 122 in place inside auger 106 as shown in FIG. 10C for subsequent assembly steps. Lastly, the retaining member 122 with the auger 106 coupled thereto is slidably mounted on the drive member 124 (or connector 172) in the direction of Arrow C until the hook member 162 of the retaining member 122 passes over rib 170 and engages recess 171.

In this assembly, the first end 126 of the auger 106 is fixedly mounted on the drive member 124 by retaining member 120 because the grooves 150, 152 of the retaining member 122 can no longer drop off of the first end 126 of the auger 106 since the drive member 124 is pinched between the inner diameter D1 of the auger 106 and the outer surface 148 of the retaining member 122. Further, rotational coupling exists because the first end 126 of the auger 106 cannot move relative to the groove 150 of the retaining member 122 because the portion of a turn 132 which is substantially perpendicular to the longitudinal axis 130 prevents the auger 106 from threading further into or unscrewing out of the groove 150. As stated above, it may be appreciated that other wire form geometries may be used to retain the auger 106 on the drive member 124 but achieving the substantially perpendicular turn 132 at the first end 126 of auger 106 does not require subsequent forming stages during production of the auger 106 as opposed to reverse bends and straight lengths. Instead, varying the pitch of auger 106 during the winding operation used to form auger 106 is relatively straightforward from a manufacturing standpoint. Also, the hook member 162 of the retaining member 122 prevents the auger 106 from being pulled out from the drive member 124 in the direction along the longitudinal axis 130 due to the engagement between hook member 162 and recess 171. It may also be appreciated that assembly 120 allows coupling of the auger 106 to the drive member 124 without the need for fasteners, adhesives, over-molding, or heat-staking.

Figure 11:
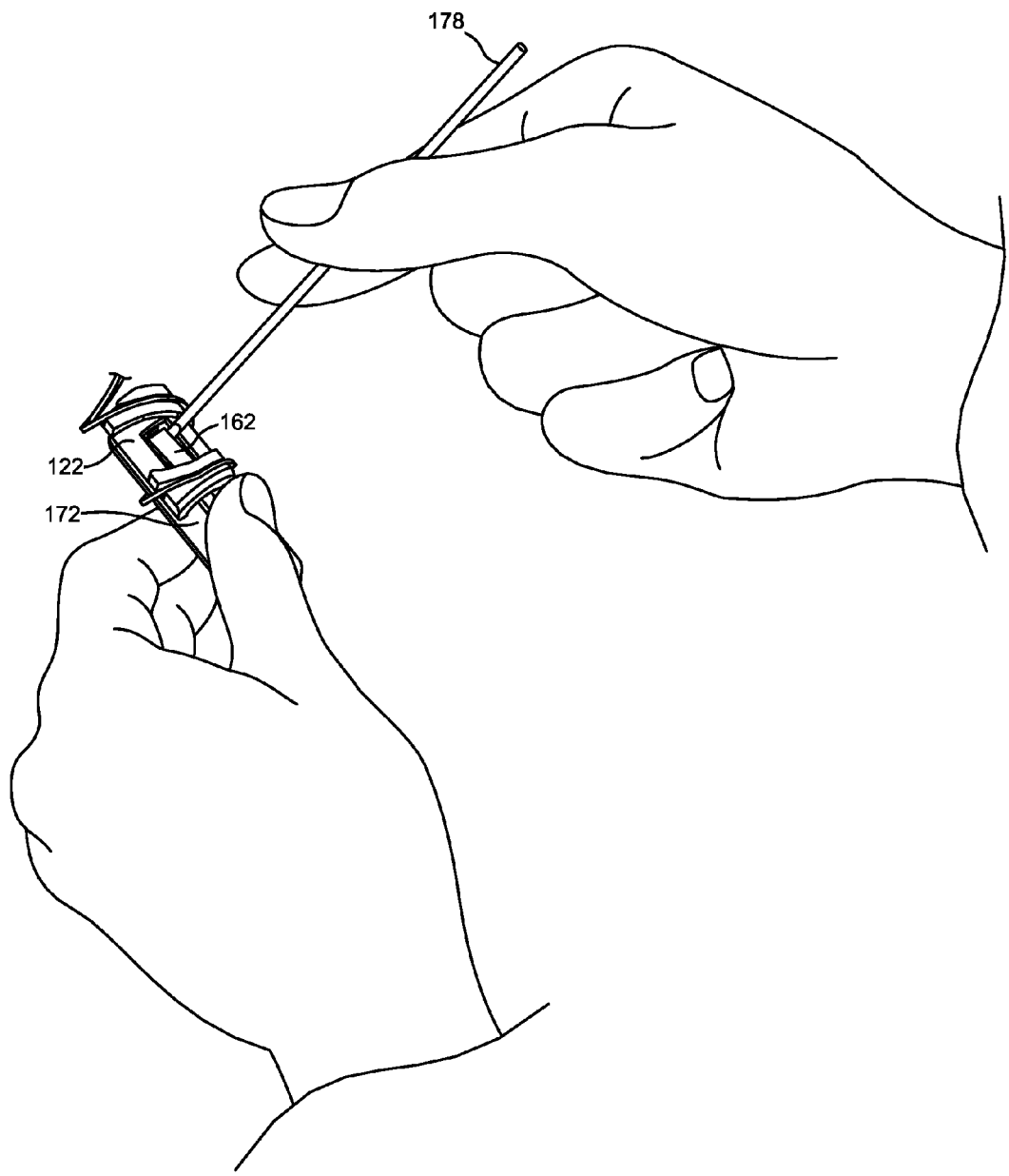
FIG. 11 is a perspective view of the disassembly of the auger assembly of FIG. 2.

FIG. 11 illustrates the procedure for decoupling the auger 106 from the drive member 124 or connector 172. A small tool 178 such as a screwdriver or the like can be used to pry the hook member 162 of the retaining member 122 out of engagement from the recess 171. The procedure described above as illustrated in FIGS. 10A-10E is simply reversed to decouple the auger 106 from the drive member 124 or connector 172 and the retaining member 122.

FIG. 12A illustrates an auger assembly 200 having a pair of augers 106A, 106B secured onto a drive member 124. Augers 106A, 106B are oppositely wound and extend from the drive member 124 in opposite directions along the longitudinal axis 130. In such an arrangement, as the auger assembly 200 rotates in the clockwise direction (indicated by Arrow CW), residual toner along auger 106A is moved towards the left (Arrow L) while residual toner along the auger 106B is moved towards the right (Arrow R).

On the other hand, FIG. 12B illustrates an auger assembly 210 having a pair of augers 106C, 106D secured onto a connector 172. In the example embodiment, augers 106C, 106D are oppositely wound and extend from the connector 172 in opposite directions along the longitudinal axis 130. In such an arrangement, as the auger assembly 210 rotates in the clockwise direction (indicated by Arrow CW), residual toner along auger 106C is moved towards the right (Arrow R) while residual toner along the auger 106D is moved towards the left (Arrow L).

Figure 13:
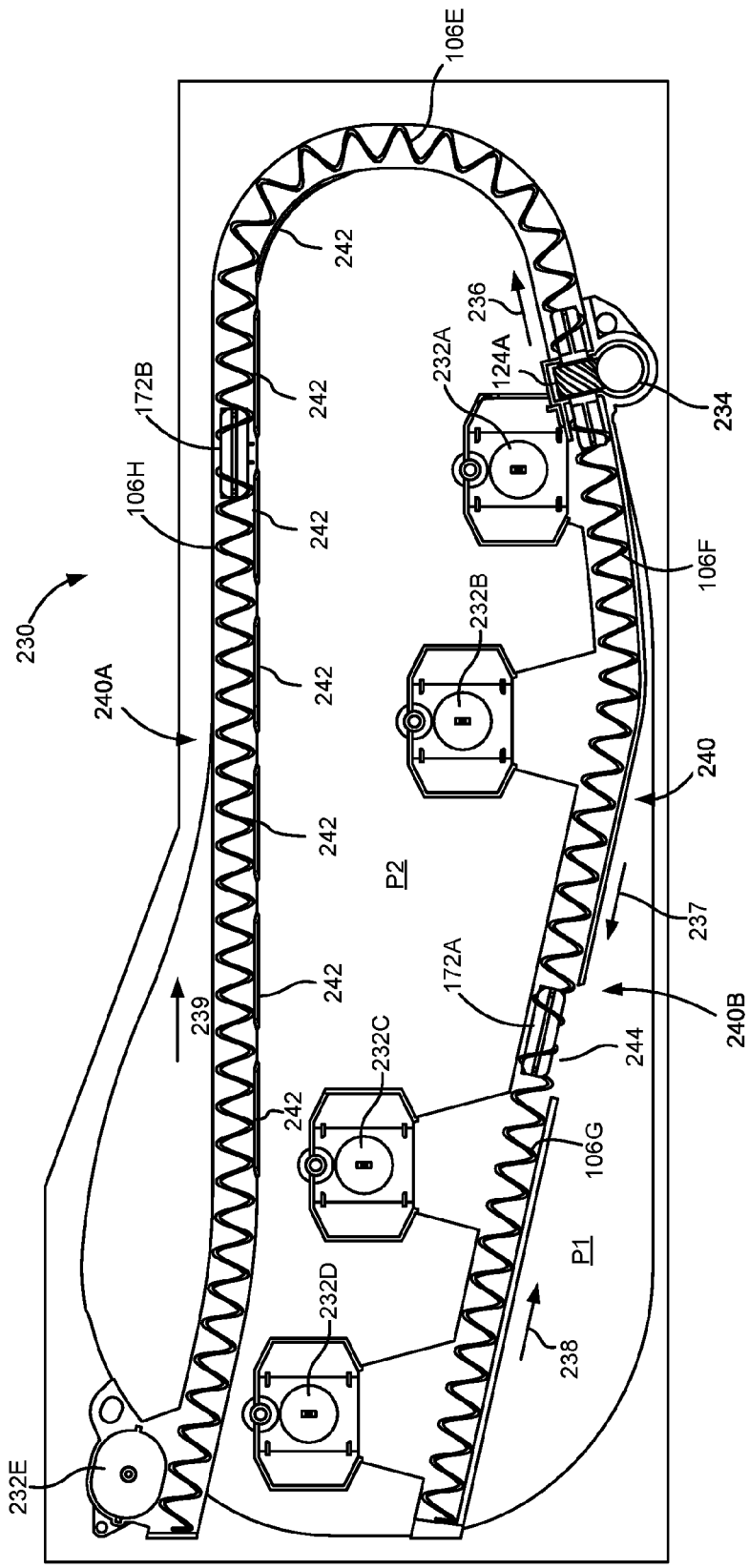
FIG. 13 is a side elevation view of a residual toner compartment having a combination of the auger assemblies of FIG. 11A and FIG. 11B.

FIG. 13 illustrates a residual toner compartment 230 employing a residual toner delivery mechanism for maximizing the amount of residual toner that can be stored within residual toner compartment 230. Residual toner enters the residual toner compartment 230 via inlets 232A, 232B, 232C, 232D, and 232E. Residual toner is continuously moved about the residual toner compartment 130 to redistribute from areas that are easy to fill to areas that are more difficult to fill. The residual toner delivery system includes wire auger segments 106E, 106F, 106G, and 106H. The residual toner deliver system receives rotational power from a rotating member 234 through drive member 124A. One end of wire auger 106E is rotatably coupled to drive member 124A while its opposite end is coupled to connector 172B. One end of wire auger 106F is rotatably coupled to the drive member 124A opposite wire auger 106A and its other end is coupled to connector 172A. Wire auger 106G is coupled to connector 172A and extends opposite wire auger 106F. Wire auger 106H is coupled to the other end of connector 172B opposite the connection of wire auger 106E. In such an arrangement, as the drive member 124A rotates (with rotating member 234 rotating in a counterclockwise direction), wire auger 106E moves the residual toner towards the right and upwards along its length as indicated by Arrow 236. Residual toner falling along the length of wire auger 106F is moved towards the left and upwards as indicated by Arrow 237. Residual toner falling along the length of wire auger 106G is moved towards the right and downwards as indicated by Arrow 238. Meanwhile, residual toner falling along the length of wire auger 106H is moved towards the right as indicated by Arrow 239. As shown, the toner delivery path 240 has a plurality of openings 242 along its upper segment 240A and an opening 244 at the lower segment 240B. Residual toner moved along the delivery path falls through the opening 244 to fill a lower portion P1 of the residual toner compartment 230 and the through the plurality of openings 242 to fill the upper portion P2 of the residual toner compartment 230. This arrangement allows residual toner to be recirculated within the residual toner compartment 230 in order to fill up even the most difficult to fill areas within the residual toner compartment 230.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. An auger assembly, comprising:
    an auger having a helical flight extending along a longitudinal axis, the auger having a central opening running along the longitudinal axis;
    a retaining member having a body including a groove on an outer surface of the body, the groove having a shape complementary to the helical flight at a longitudinal end of the auger, at least a portion of the longitudinal end of the auger is retained within the groove; and
    a rotatable coupling member extending along the longitudinal axis, the retaining member is removably coupled to the rotatable coupling member, at least a portion of the rotatable coupling member is positioned within the central opening of the auger, contact between the rotatable coupling member and a first circumferential section of an inner diameter of the longitudinal end of the auger presses the retaining member against a second circumferential section of the inner diameter of the longitudinal end of the auger.

2. The auger assembly of claim 1, wherein the longitudinal end of the auger includes at least a portion of a turn having substantially zero pitch.

3. The auger assembly of claim 1, wherein the rotatable coupling member includes a plurality of radially extending ribs, the radially extending ribs contact the inner diameter of the longitudinal end of the auger in the first circumferential section.

4. The auger assembly of claim 1, wherein the rotatable coupling member includes gear teeth for receiving rotational power.

5. The auger assembly of claim 1, wherein the retaining member is removably coupled to the rotatable coupling member by a snap-fit engagement.

6. The auger assembly of claim 5, wherein at least one of the retaining member and the rotatable coupling member includes a deflectable hook and the other of the retaining member and the rotatable coupling member includes a recess complementary to the deflectable hook and a rib securing the deflectable hook in the recess.

7. The auger assembly of claim 1, wherein the auger is flat wire auger.

8. An auger assembly, comprising:
an auger having a helical flight extending along a longitudinal axis, the auger having a central opening running along the longitudinal axis;
a retaining member having a body including a groove on an outer surface of the body, the groove having a shape complementary to the helical flight at a longitudinal end of the auger, at least a portion of the longitudinal end of the auger is retained within the groove, the retaining member is positioned against a first circumferential section of an inner diameter of the longitudinal end of the auger; and
a rotatable coupling member extending along the longitudinal axis, the retaining member is removably coupled to the rotatable coupling member, at least a portion of the rotatable coupling member is positioned within the central opening of the auger and pinched between the retaining member and a second circumferential section of the inner diameter of the longitudinal end of the auger.

9. The auger assembly of claim 8, wherein the longitudinal end of the auger includes at least a portion of a turn having substantially zero pitch.

10. The auger assembly of claim 8, wherein the rotatable coupling member includes a plurality of radially extending ribs, the radially extending ribs contact the inner diameter of the longitudinal end of the auger in the second circumferential section.

11. The auger assembly of claim 8, wherein the rotatable coupling member includes gear teeth for receiving rotational power.

12. The auger assembly of claim 8, wherein the retaining member is removably coupled to the rotatable coupling member by a snap-fit engagement.

13. The auger assembly of claim 12, wherein at least one of the retaining member and the rotatable coupling member includes a deflectable hook and the other of the retaining member and the rotatable coupling member includes a recess complementary to the deflectable hook and a rib securing the deflectable hook in the recess.

14. The auger assembly of claim 8, wherein the auger is flat wire auger.

* * * * *